(12) United States Patent
Lin et al.

(10) Patent No.: US 10,146,450 B1
(45) Date of Patent: Dec. 4, 2018

(54) MANAGING A POOL OF STORAGE SLICES VIA CONSUMPTION ESTIMATION BASED ON HISTORICAL DATA

(71) Applicant: EMC Corporation, Hopkinton, MA (US)

(72) Inventors: Binbin Liu Lin, Sudbury, MA (US); Natasha Gaurav, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 233 days.

(21) Appl. No.: 14/980,510

(22) Filed: Dec. 28, 2015

(51) Int. Cl.
*G06F 12/00* (2006.01)
*G06F 3/06* (2006.01)

(52) U.S. Cl.
CPC .......... *G06F 3/0617* (2013.01); *G06F 3/0604* (2013.01); *G06F 3/0631* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,734,888 B1 * | 6/2010 | Hamilton | G06F 3/0605 711/114 |
| 9,164,692 B2 | 10/2015 | Kavuri | |
| 9,176,789 B2 | 11/2015 | Lowes et al. | |
| 9,262,449 B2 | 2/2016 | Amarendran et al. | |
| 9,274,714 B2 | 3/2016 | Kamila et al. | |
| 9,275,086 B2 | 3/2016 | Kumarasamy et al. | |
| 9,282,166 B2 | 3/2016 | Markley et al. | |
| 9,292,815 B2 | 3/2016 | Vibhor | |
| 9,342,537 B2 | 5/2016 | Kumarasamy et al. | |
| 2004/0068636 A1 * | 4/2004 | Jacobson | G06F 3/0605 711/203 |
| 2007/0294206 A1 * | 12/2007 | Korman | G06F 3/0617 |
| 2010/0106933 A1 * | 4/2010 | Kamila | G06F 3/0605 711/171 |
| 2010/0299489 A1 * | 11/2010 | Balachandriah | G06F 11/3442 711/162 |
| 2010/0312976 A1 * | 12/2010 | Kaneda | G06F 3/0605 711/162 |
| 2010/0312979 A1 * | 12/2010 | Kavuri | G06F 3/061 711/165 |
| 2012/0042122 A1 * | 2/2012 | Beniyama | G06F 3/0608 711/112 |
| 2014/0156956 A1 * | 6/2014 | Ezra | G06F 3/065 711/162 |
| 2014/0281330 A1 * | 9/2014 | Baldwin | G06F 12/023 711/170 |

* cited by examiner

*Primary Examiner* — Prasith Thammavong
*Assistant Examiner* — Jason W Blust
(74) *Attorney, Agent, or Firm* — BainwoodHuang

(57) ABSTRACT

A technique is directed to managing a pool of slices provided by data storage equipment. The technique involves monitoring usage of the pool of slices provided by the data storage equipment, and generating an estimate based on the monitored usage of the pool of slices. The estimate identifies when a slice usage level of the pool of slices will reach a predefined usage level (e.g., the number of days remaining before the pool will become completely full, 90% full, 80% full, etc.). The technique further involves, in response to the estimate reaching a predefined threshold (e.g., when the number of days remaining is 5 days, 4 days, 3 days, etc.), performing a remedial activity to prevent full consumption of the pool of slices.

20 Claims, 7 Drawing Sheets

US 10,146,450 B1

MANAGING A POOL OF STORAGE SLICES VIA CONSUMPTION ESTIMATION BASED ON HISTORICAL DATA

BACKGROUND

A data storage system stores information on behalf of one or more host computers. To store new information, some data storage systems allocate slices from a storage pool. Each slice is an increment of storage space such as 256 MB or 1 GB and may be derived from a portion of a logical unit of storage LUN such as a Flare LUN (FLU) or a Redundant Array of Independent Disks (RAID) group.

Software running on such a data storage system may replenish the storage pool by routinely deleting expired snapshots. Along these lines, when the software detects that a storage pool has reached a specified level of consumption (e.g., 90%), the software may automatically remove any expired snapshot data and reclaim the slices used by that snapshot data. Similarly, when the software detects that a specified percentage of the storage pool has been filled with snapshot data (e.g., 15%), the software may automatically remove any expired snapshot data and reclaim the slices used by that snapshot data.

SUMMARY

Unfortunately, there are deficiencies to the above described conventional approaches to automatically removing expired snapshot data upon reaching a specified slice usage limit (e.g., upon filling 90% of the storage pool with data, upon filling 15% of the storage pool with snapshot data, etc.). In particular, such operation relies only on actual consumption amounts and still does not guarantee that the storage pool will not become completely filled with data. If the storage pool becomes completely filled with data, further input/output (IO) requests received by the data storage system will fail because there is no space left or not enough space left.

In contrast to the above-described conventional approach which relies solely on actual consumption amounts, improved techniques are directed to managing a pool of slices via consumption estimation based on historical data. Along these lines, the number of slices consumed from the storage pool for a period of time (e.g., an hour, a day, a week, etc.) can be predicted based on past usage measurements. Such a prediction can then be used to estimate how much time is left before a particular consumption milestone is reached (e.g., 80% utilization, 90% utilization, 100% utilization, etc.). Similarly, the number of slices consumed for snapshots for a period of time can be predicted based on past usage measurements, and such a prediction can then be used to estimate when a limited amount of snapshot space will be fully consumed (e.g., 15% of the storage pool, 20%, 25%, 30%, etc.). The underlying data storage equipment is then able to take remedial steps in response to such estimation, e.g., provide an alert to a user, automatically delete snapshot data, combinations thereof, etc.

One embodiment is directed to a method of managing a pool of slices provided by data storage equipment. The computerized-implemented method includes monitoring usage of the pool of slices provided by the data storage equipment, and generating an estimate based on the monitored usage of the pool of slices. The estimate identifies when a slice usage level of the pool of slices will reach a predefined usage level (e.g., the number of days remaining before the pool will become completely full, 90% full, 80% full, etc.). The method further includes, in response to the estimate reaching a predefined threshold (e.g., when the number of days remaining is 5 days, 4 days, 3 days, etc.), performing a remedial activity to prevent full consumption of the pool of slices.

In some arrangements, monitoring the usage of the pool of slices includes periodically measuring slice usage level information of the pool of slices. Such operation collects historical data describing usage of the pool of slices.

In some arrangements, periodically measuring the slice usage level information includes recording a total number of slices in the pool and a series of slice usage level entries. In these arrangements, each slice usage level entry includes a timestamp and a number of currently used slices in the pool.

In some arrangements, the monitored usage of the pool of slices includes multiple measured slice usage levels. In these arrangements, generating the estimate may include deriving a "free slices consumed per day" value from the multiple measured slice usage levels, the "free slices consumed per day" value indicating a number of free slices that are consumed by data from the pool of slices per day.

In some arrangements, generating the estimate further includes providing, as the estimate and based on the "free slices consumed per day" value, a "number of days" projection which identifies a number of further days before the pool of slices will be fully consumed. In other arrangements, generating the estimate further includes providing, as the estimate and based on the "free slices consumed per day" value, a "number of days" projection which identifies a number of further days before the pool of slices will be X % consumed (e.g., where X is a number between 70 and 100). In yet other arrangements, generating the estimate further includes providing, as the estimate and based on the "free slices consumed per day" value, a "number of days" projection which identifies a number of further days before there will be only X days left until the pool of slices is fully consumed (e.g., where X is a positive integer).

In some arrangements, the monitored usage of the pool of slices includes multiple measured slice usage levels. In these arrangements, generating the estimate may include deriving a "snapshot slices consumed per day" value from the multiple measured slice usage levels, the "snapshot slices consumed per day" value indicating a number of slices that are consumed for snapshot data per day.

In some arrangements, generating the estimate further includes providing, as the estimate and based on the "snapshot slices consumed per day" value, a "number of days" projection which identifies a number of further days before an allocated snapshot space will be fully consumed. In some arrangements, generating the estimate further includes providing, as the estimate and based on the "snapshot slices consumed per day" value, a "number of days" projection which identifies a number of further days before the pool of slices will be X % consumed by snapshot data (e.g., where X is a number between 5 and 30). In some arrangements, generating the estimate further includes providing, as the estimate and based on the "snapshot slices consumed per day" value, a "number of days" projection which identifies a number of further days before there will be only X days left until an allocated snapshot space will be fully consumed (e.g., where X is a positive integer).

In some arrangements, performing the remedial activity to prevent full consumption of the pool of slices includes, in response to the estimate reaching the predefined threshold, outputting an alert to a user based on the estimate. In these arrangements, the alert identifies a time when the pool of slices is expected to be fully consumed.

In some arrangements, the method further includes, in response to the estimate reaching the predefined threshold, outputting a snapshot projection which indicates how many new snapshots the pool of slices is expected to store before the pool of slices becomes fully consumed. This snapshot projection can be included with the alert or provided separately.

In some arrangements, performing the remedial activity to prevent full consumption of the pool of slices includes, in response to the estimate reaching the predefined threshold, automatically deleting a set of snapshots from the pool of slices. Such deletion activity may be included in combination with providing alerts and/or projections to the user.

In some arrangements, automatically deleting the set of snapshots from the pool of slices includes, in response to the estimate reaching the predefined threshold, removing an oldest deletable snapshot from the pool of slices. In other arrangements, automatically deleting the set of snapshots from the pool of slices includes, in response to the estimate reaching the predefined threshold, removing a largest deletable snapshot from the pool of slices. In yet other arrangements, automatically deleting the set of snapshots from the pool of slices includes, in response to the estimate reaching the predefined threshold, removing the set of snapshots from the pool of slices in accordance with a snapshot list providing snapshot level granularity for automatic deletion.

In some arrangements, performing the remedial activity to prevent full consumption of the pool of slices includes, detecting that the estimate has reached the predefined threshold before detection that an actual slice usage level of the pool of slices has reached a threshold that triggers snapshot auto-deletion. In these arrangements, standard auto-deletion protocols can be combined with the improved techniques and, in certain situations, the improved techniques trigger auto-deletion ahead of any of the standard auto-deletion protocols thus providing extra protection against fully consuming the entire pool of slices.

Another embodiment is directed to electronic circuitry which includes memory and control circuitry coupled to the memory. The memory stores instructions which, when carried out by the control circuitry, cause the control circuitry to:

(A) monitor usage of a pool of slices provided by data storage equipment,
(B) generate an estimate based on the monitored usage of the pool of slices, the estimate identifying when a slice usage level of the pool of slices will reach a predefined usage level, and
(C) in response to the estimate reaching a predefined threshold, performing a remedial activity to prevent full consumption of the pool of slices.

Yet another embodiment is directed to a computer program product having a non-transitory computer readable medium which stores a set of instructions to manage a pool of slices provided by data storage equipment; the set of instructions, when carried out by computerized circuitry, causing the computerized circuitry to perform a method of:

(A) monitoring usage of the pool of slices provided by the data storage equipment;
(B) generating an estimate based on the monitored usage of the pool of slices, the estimate identifying when a slice usage level of the pool of slices will reach a predefined usage level; and
(C) in response to the estimate reaching a predefined threshold, performing a remedial activity to prevent full consumption of the pool of slices.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in managing a pool of storage slices via consumption estimation based on historical data.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to managing a pool of storage slices via consumption estimation based on historical data. Along these lines, the number of slices consumed from a storage pool for a period of time (e.g., an hour, a day, a week, etc.) can be predicted based on past usage measurements. Such a prediction can then be used to estimate how much time is left before a particular consumption milestone is reached (e.g., 80% utilization, 90% utilization, 100% utilization, etc.). Similarly, the number of slices consumed for snapshots for a period of time can be predicted based on past usage measurements, and such a prediction can then be used to estimate when a limited amount of snapshot space will be fully consumed (e.g., 15% of the storage pool, 20%, 25%, 30%, etc.). The underlying data storage equipment is then able to take remedial steps in response to such estimation, e.g., provide an alert to a user, automatically delete snapshot data, combinations thereof, etc.

Figure 1:
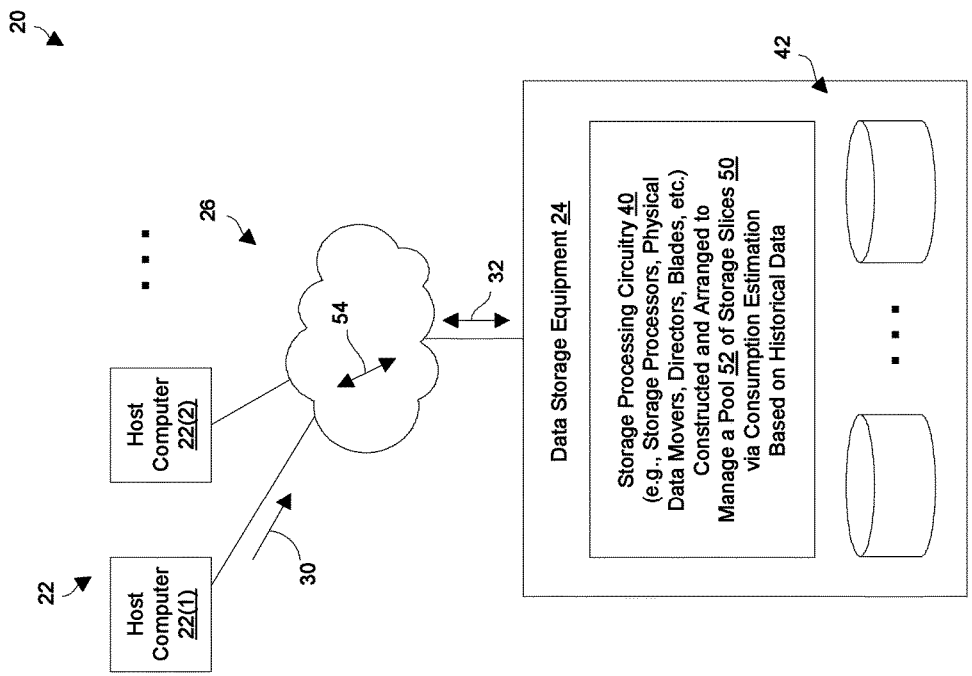
FIG. 1 is a block diagram of a data storage environment in which a pool of slices is managed via consumption estimation based on historical data.

FIG. 1 shows a data storage environment 20 in which a pool of storage slices is managed via consumption estimation based on historical data. The data storage environment 20 includes host computers 22(1), 22(2), . . . (collectively, host computers 22), data storage equipment 24, and a communications medium 26.

Each host computer 22 is constructed and arranged to perform useful work. For example, a host computer 22 may operate as a file server, a web server, an email server, an enterprise server, a dedicated server which storage specialized information, and so on. The host computers 22 provide I/O requests 30 (e.g., small computer system interface or SCSI commands, file-based commands, etc.) to the data storage equipment 24 to store host data 32 in and read host data 32 from the data storage equipment 24.

The data storage equipment 24 includes storage processing circuitry 40 and a set of storage devices 42. The storage processing circuitry 40 may include one or more physical storage processors, data movers, director boards, blades, I/O modules, storage device controllers, switches, combinations thereof, and so on.

The storage processing circuitry 40 is constructed and arranged to process the I/O requests 30 from the host computers 22 by robustly and reliably storing host data 32 in the set of storage devices 42 and retrieving the host data 32 from the set of storage devices 42. As new storage space is needed (e.g., to store new host data, to create a new snapshot, etc.), the storage processing circuitry 40 allocates unused storage slices 50 from a pool 52 of storage slices 50. Each slice 50 is an increment of storage space (e.g., 256 MB, 512 MB, 1 GB, 2 GB, etc.) and may be derived from a portion of underlying storage (e.g., a FLU, a RAID group, etc.). Additionally, as will be explained in further detail shortly, the storage processing circuitry 40 estimates when certain storage milestones will be reached, and takes remedial action based on such estimation.

The communications medium 26 is constructed and arranged to connect the various components of the data storage environment 20 together to enable these components to exchange electronic signals 54 (e.g., see the double arrow 54). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting SAN-based communications, LAN-based communications, WAN-based communications, cellular communications, distributed infrastructure communications, other topologies, combinations thereof, etc.

During operation, the storage processing circuitry 40 of the data storage equipment 24 consumes slices 50 from the storage pool 52 provided by the set of storage devices 42. Along these lines, when a host computer 22 writes new host data (e.g., to a LUN, to a filesystem, etc.), the storage processing circuitry 40 allocates free slices 50 from the pool 52 to hold the new host data. Additionally, from time to time, the storage processing circuitry 40 may capture a snapshot of the data (e.g., a copy of the LUN or filesystem at a particular point in time), and the storage processing circuitry 40 then consumes free slices 50 from the pool 52 to hold any new versions of the data since the snapshot was captured. In some arrangements, the storage pool 52 offers global storage space for snapshots of multiple LUNs, filesystems, combinations thereof, etc.

Additionally, the storage processing circuitry 40 monitors pool utilization to make sure that the storage pool 52 is not overloaded with data. To this end, the storage processing circuitry 40 manages snapshots. Along these lines, when a snapshot expires (e.g., when the snapshot passes its expiration date), the storage processing circuitry 40 destroys the expired snapshot and, if such operation frees up storage slices, reclaims the slices consumed by the snapshot data for reuse in the pool 52 (e.g., some slices may be still be needed because they hold a current version of the data or data for a non-deleted snapshot). Also, the storage processing circuitry 40 implements an auto-delete policy which uses pool space thresholds and snapshot space thresholds to perform auto-deletion of snapshots if the thresholds are triggered (e.g., when the total pool space used reaches 95%, when the total snapshot space reaches 20% of the storage pool 52, etc.).

Furthermore, as the storage processing circuitry 40 monitors pool utilization, the storage processing circuitry 40 maintains certain metrics in order to intelligently estimate future consumption of the storage pool 52. Accordingly, as an additional safeguard against fully consuming the pool 52 of slices 50, remedial activity (e.g., alerting a user, auto-deleting one or more snapshots, etc.) can be performed in response to the estimation. Further details will now be provided with reference to FIG. 2.

Figure 2:
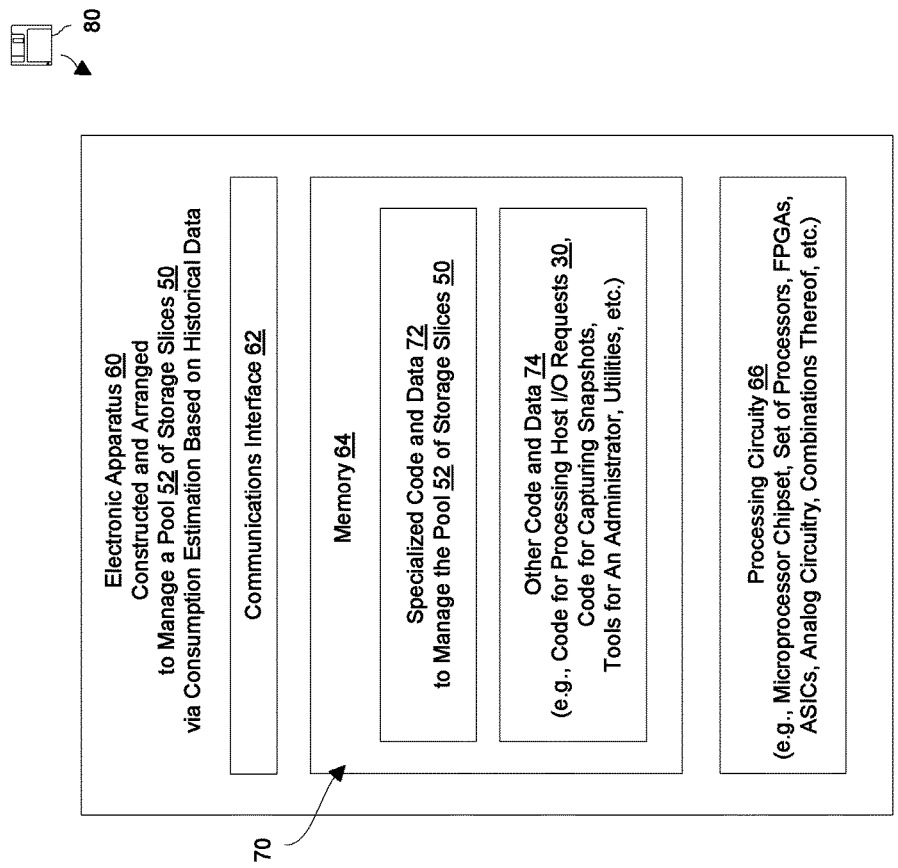
FIG. 2 is a block diagram of an electronic apparatus of the data storage environment of FIG. 1.

FIG. 2 shows particular details of an electronic apparatus 60 which is constructed and arranged to manage a pool 52 of storage slices 50 via consumption estimation based on historical data. The electronic apparatus 60 includes a communications interface 62, memory 64, and processing circuitry 66. Although the circuitry for such an electronic apparatus 60 may be separate from storage processing circuitry 40 of the data storage equipment 24, in some arrangements such circuitry is integrated with the storage processing circuitry 40 (also see FIG. 1).

The communications interface 62 is constructed and arranged to connect the electronic apparatus 60 to the communications medium 26 (FIG. 1) to enable communications with other devices of the data storage environment 20 (e.g., the host computers 22). Such communications may be SAN-based, IP-based, cellular-based, cable-based, fiber-optic based, wireless, cloud-based, combinations thereof, and so on. Accordingly, the communications interface 62 enables the electronic apparatus 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including specialized code and data 72, and other code and data 74. The specialized code and data 72 is intended to represent a set of instructions that direct the processing circuitry 66 to smartly manage the pool 52 of storage slices 50 via consumption estimates based on historical data. The other code and data 74 refers generally to instructions that direct the processing circuitry 66 to perform various other operations, e.g., an operating system to manage computerized resources (processor cycles, memory space, etc.), drivers, code for processing host I/O requests 30, code for capturing snapshots, administrative tools, utilities, other user-level applications, and so on. When the electronic apparatus 60 forms part of the data storage equipment 24 (FIG. 1), the memory 64 may further include the actual storage that supplies the slices 50 forming the storage pool 52.

The processing circuitry 66 is constructed and arranged to operate in accordance with the various software constructs 70 stored in the memory 64. As will be explained in further detail shortly, the processing circuitry 64 when operating in accordance with the specialized code and data 72, forms specialized circuitry that manages the storage pool 52. Such processing circuitry 66 may be implemented in a variety of ways including via one or more processors (or cores)

running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic apparatus 60. In particular, the computer program product 80 has a non-transitory (or non-volatile) computer readable medium which stores a set of instructions which controls one or more operations of the electronic apparatus 60. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 3.

Figure 3:
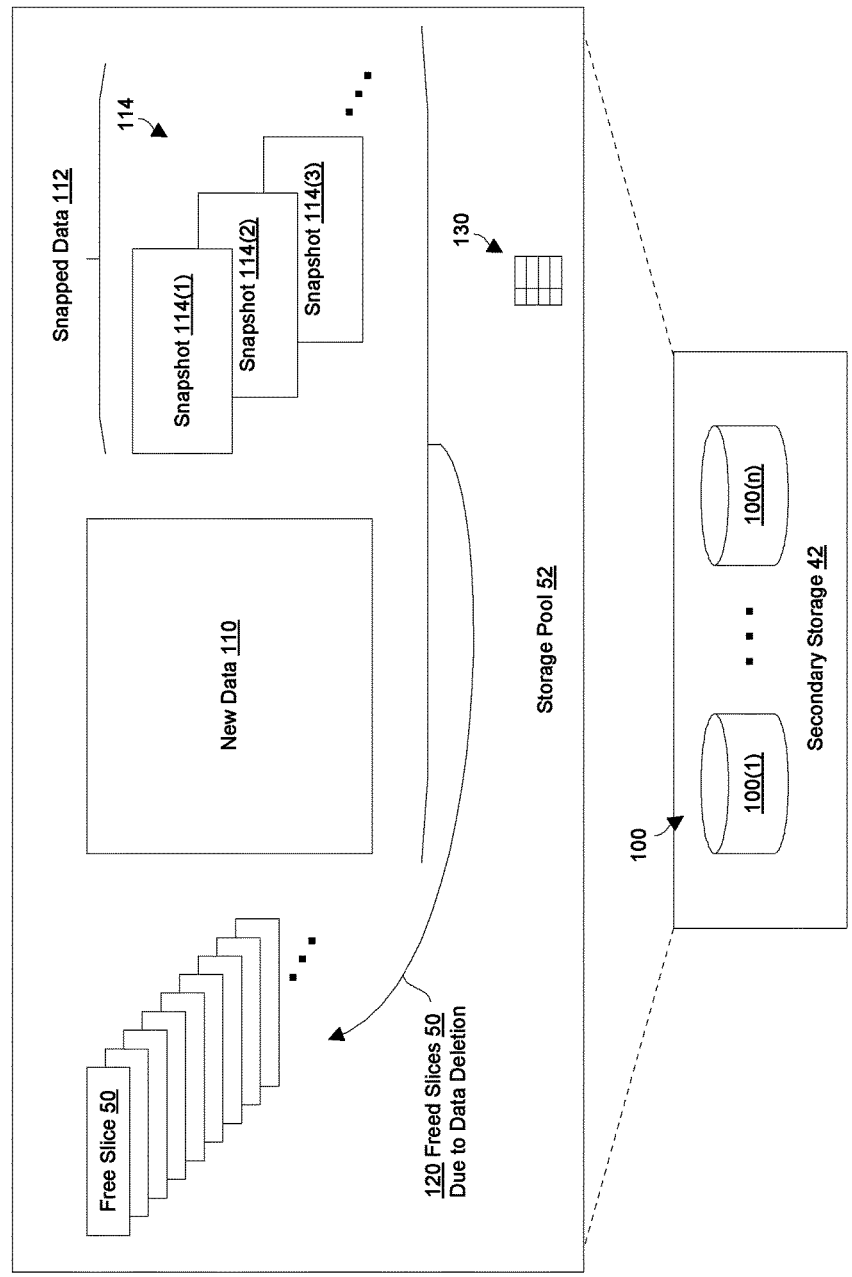
FIG. 3 is a block diagram illustrating particular details of the pool of slices.

FIG. 3 shows particular details of the storage pool 52 of slices 50. As shown, the secondary storage 42 (FIG. 1) includes multiple storage devices 100(1), . . . , 100(n) (collectively, storage devices 100). In some arrangements, the storage devices 100 provide various access speeds to form different storage tiers, e.g., a tier of fast flash memory, a tier of slower flash memory, a medium tier of serial attached SCSI (SAS) drives, a slower tier of near line SAS drives, etc.

The storage devices 100 provide the pool 52 of storage slices 50 for holding data. Each slice 50 includes multiple blocks and is capable of containing various types of data, e.g., new data 110 and snapshot (or snapped) data 112. The snapped data 112 consists of data that forms one or more snapshots 114(1), 114(2), 114(3), . . . (collectively, snapshots 114) and that has been replaced by new data 110.

During operation, the storage processing circuitry 40 of the data storage equipment 24 allocates free slices 50 of the pool 52 to the new data 110 (i.e., the storage processing circuitry 40 stores the new data 110 in the available slices 50). Also, from time to time, the storage processing circuitry 40 creates a snapshot 114 (e.g., periodically by a background service, in response to a command manually entered by a user, combinations thereof, etc.). Such snapshots 114 allow the user to go back to an earlier copy of stored data (e.g., to restore an earlier copy of a LUN, to retrieve a corrupted filesystem or file, to a recover lost transaction, etc.).

When data is deleted or when a snapshot 114 expires, the data contained within the used slices 50 may no longer be needed. Accordingly, the storage processing circuitry 40 frees those slices 50 making them available for reuse (see arrow 120 in FIG. 3). In particular, the specialized circuitry formed by the processing circuitry 66 operating in accordance with the specialized code and data 72 (FIG. 2) routinely reclaims slices 50 for reuse in the storage pool 52.

It should be understood that a goal of the specialized circuitry is to manage various slice usage levels of the storage pool 52. Along these lines, the specialized circuitry prevents the storage pool 52 from becoming full, and prevents the snapshots 114 from consuming too much of the storage pool 52. If the storage pool 52 were to become completely full, the data storage equipment 24 would be prevented from completing further I/O requests 30.

To prevent situations such as the storage pool 52 becoming completely full or to prevent snapshots 114 from consuming too much of the storage pool 52, the specialized circuitry performs smart estimation operations to estimate how much time is left (e.g., weeks, days, hours, etc.) before such situations arise. To this end, the specialized circuitry collects historical data 130 (see FIG. 3). In some arrangements, the specialized circuitry records, as at least some of the historical data 130, the total number of slices 50 in the storage pool 52 and a series of slice usage level entries, each slice usage level entry including a timestamp and a number of currently used slices 50 in the pool 52. Such slice consumption information as well as other slice data (e.g., the number of available free slices 50 in the pool 52) can be easily obtained by querying a slice manager component of the data storage equipment 24.

From such historical data 130 (e.g., based on the slice usage level entries), the specialized circuitry maintains a "free slices consumed per day" metric which indicates the number of free slices 50 that are consumed from the storage pool 52 per day (or per week, or per hour, etc.). In some arrangements, the "free slices consumed per day" metric is not based on a single 24-hour window (e.g., the number of slices 50 consumed in the last 24 hours), but based on several 24-hour windows (e.g., the average number of slices 50 consumed per day over the last 10 days, or 30 days, etc.).

With this "free slices consumed per day" metric now available, the specialized circuitry is able to estimate the number of days before the storage pool 52 will become full. In particular, the specialized circuitry can perform equation (1) below:

$$\text{\# of Days Left Before the Storage Pool Becomes Full} = \frac{\text{\# of Free Slices Remaining in the Storage Pool}}{\text{\# of Free Slices Consumed Per Day}}. \quad (1)$$

For example, suppose that the specialized circuitry determines that the data storage equipment 24 consumes an average of 5 GB (or five 1-GB slices) per day based on historical data from the last 20 days. Further suppose that the specialized circuitry has determined that there are 23 GB (23 1-GB slices) of storage left in the storage pool 52. Using equation (1), the specialized circuitry estimates that there are a little over four days left before the storage pool 52 becomes full.

Once the specialized circuitry projects the number of days left before the storage pool 52 becomes full, the specialized circuitry compares this result to a predefined threshold (e.g., a default parameter, a value set by the user, a tuned setting, etc.). If the number of days left is less than or equal to the predefined threshold, the specialized circuitry takes remedial action.

For example, suppose that the specialized circuitry estimates that there are 4.5 days left before the storage pool 52 becomes full and that the predefined threshold is 5 days. Since the number of days left is less than the predefined threshold, such a determination triggers the specialized circuitry to perform a set of remedial operations.

One example of a remedial operation is for the specialized circuitry to output an alert to the user. Such an alert puts the user on notice so that the user can proactively address the situation before the storage pool 52 becomes full (e.g., delete a set of snapshots 114, delete files, move or archive a LUN to another location, add more storage, etc.).

Figure 4:
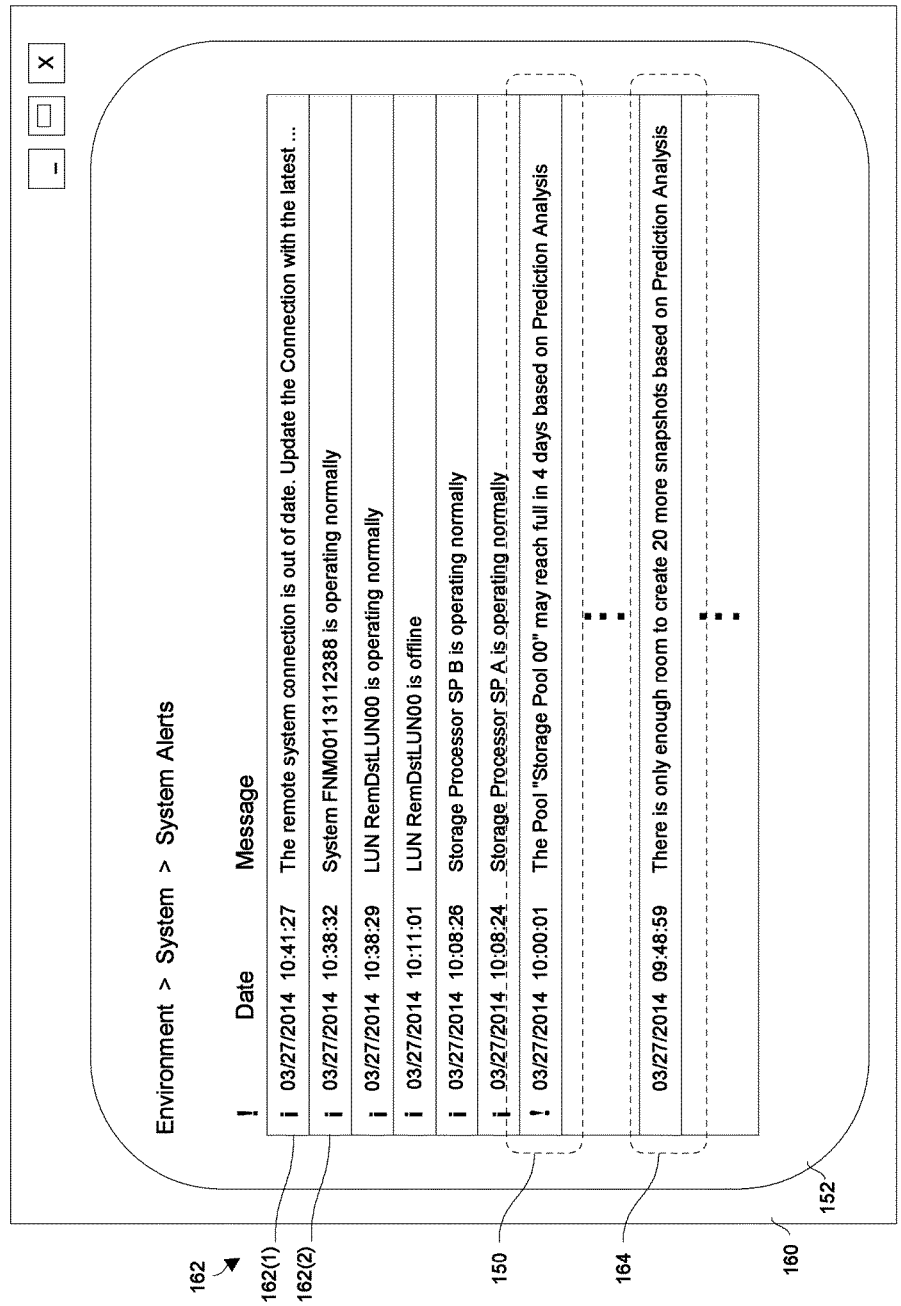
FIG. 4 is a block diagram illustrating particular details of a screen of a graphical user interface (GUI) provided by the electronic apparatus of FIG. 2.

FIG. 4 shows an example alert 150 that is provided on a screen 152 of a graphical user interface (GUI) 160 to a user. In particular, the screen 152 of the GUI 160 provides a list of notifications/status entries 162(1), 162(2), . . . (collectively, entries 162) reporting various items of information to the user. Among the entries 162, is the alert 150 indicating an amount of time remaining before the storage pool 52 is expected to become full, i.e., when the storage pool 52 is expected to be fully consumed with data.

As an alternative or in addition to alerting the user as to when the storage pool will become completely full, the specialized circuitry can predict the number of days before the storage pool 52 reaches a particular percentage of fullness (e.g., 95% full, 90% full, etc.). In particular, the specialized circuitry can query the slice manager to provide the total number of slices 50 available in the storage pool 52, and the total number of free slices 50 available for use. In particular, the specialized circuitry can perform equation (2) below:

$$\% \text{ of Pool Fullness} = \frac{\# \text{ of Used Slices in the Storage Pool}}{\text{Total } \# \text{ of Slices in the Storage Pool}}. \quad (2)$$

For example, suppose that there are 1000 1-GB slices in the storage pool 52 (i.e., 1 TB of storage), and currently 875 used 1-GB slices. Accordingly, the storage pool 52 is 87.5% consumed with data.

Further suppose that the user has configured the specialized circuitry to provide an alert when the specialized circuitry estimates that there are 5 days (or less) before the storage pool 52 will reach 90% consumed (i.e., via another predefined threshold/policy). That is, the specialized circuitry is configured to notify the user 5 days before the storage pool 52 will reach 90% consumed (i.e., 5 days before there will only be 100 free 1-GB slices left in the pool 52). In this situation, if the specialized circuitry has determined that five 1-GB slices are consumed per day on average, and that there are only 125 free 1-GB slices available, the specialized circuitry determines that there are only 5 days worth of free slices (i.e., 25 free 1-GB slices) before the storage pool 52 is projected to be 90% full. In this example, such a determination triggers the specialized circuitry to display an alert in the GUI 160 such as "The Pool "Storage Pool 00" may reach 90% in 5 days based on Prediction Analysis".

Additionally, the specialized circuitry is able to obtain consumption information regarding snapshots 114 from the slice manager component of the data storage equipment 24 and then save this information as historical data 130 (FIG. 3). Along these lines, the specialized circuitry is able to record the current number of slices 50 for snapshots 114 (or the current amount of snapped data 112) during operation (e.g., recorded at the same point each hour, day, etc.). From this information, the specialized circuitry is able to derive a "snapshot slices consumed per day" metric (or per hour, or per week, etc.). In some arrangements, this metric is not based on a single time window (e.g., the number of snapshot slices 50 consumed in the last 24 hours), but based on several time windows (e.g., the average number of snapshot slices 50 consumed per day over the last 10 days, or 30 days, etc.).

With this "snapshot slices consumed per day" metric now available, the specialized circuitry is able to estimate the number of days before the level of snapshot storage reaches a certain percentage of the storage pool 52. Along these lines, suppose that the storage pool 52 has 1000 1-GB slices, and that the user has set a limit on the amount of the storage pool 52 available for snapshots to be 20% (i.e., 200 1-GB slices). Here, the specialized circuitry is able to derive the number of free slices available for snapshots left in the pool using equation (3) below:

$$\# \text{ of Free Slices Available for Snapshots} = \quad (4)$$
$$\text{Total Slices Available for Snapshots} -$$
$$\# \text{ of Slices Currently Consumed by Snapshots}.$$

For example, if there 185 1-GB slices currently consumed by snapshots 114, there are only 15 1-GB slices remaining for snapshots 114 (i.e., 200−185=15).

At this point, it should be understood that the specialized circuitry can estimate the number of days remaining before running out of space for snapshots 114 based on the number of snapshot slices consumed per day. In particular, the specialized circuitry can perform equation (4) below:

$$\# \text{ of Days Before Running Out of Space for Snapshots} = \quad (3)$$
$$\frac{\# \text{ of Free Slices Available for Snapshots}}{\# \text{ of Snapshot Slices Consumed Per Day}}.$$

For example, suppose that the user has configured the specialized circuitry to provide an alert when the specialized circuitry predicts that there are 3 days (or less) before running out of space for snapshots 114. In this situation, if there are 15 1-GB slices remaining for snapshots 114, and there are an average of 5 1-GB slices consumed for snapshots 114 per day, then the specialized circuitry estimates that there are 3 days before the storage pool 52 will run out of space for snapshots 114. Such a determination triggers the specialized circuitry to output an alert to the user in the GUI 160 such as "The Pool "Storage Pool 00" may reach Full Snapshot Capacity in 3 days based on Prediction Analysis".

Alternatively, the specialized circuitry can be configured to simply estimate how many more snapshots 114 can be taken before all of the space allowed for snapshots 114 is consumed (e.g., the remaining snapshot space divided by the average space per snapshot). The specialized circuitry is able to then provide this information to the user as shown by the notification 164 in FIG. 4.

At this point it should be understood that the specialized circuitry formed by the processing circuitry 66 operating in accordance with the specialized code and data 72 (FIG. 2) can be configured to perform auto-deletion of snapshots 114 as an alternative to providing the user with an alert or in addition to providing the user with an alert. For example, the specialized circuitry is configurable to automatically delete a set of oldest snapshot(s) 114 or largest snapshot(s) 114 from the storage pool 52 (FIG. 3) when a consumption estimate crosses a particular threshold. Moreover, the specialized circuitry is configurable to automatically delete a particular snapshot 114 when a consumption estimate crosses a particular threshold (i.e., snapshot auto-deletion at per snapshot granularity).

Figure 5:
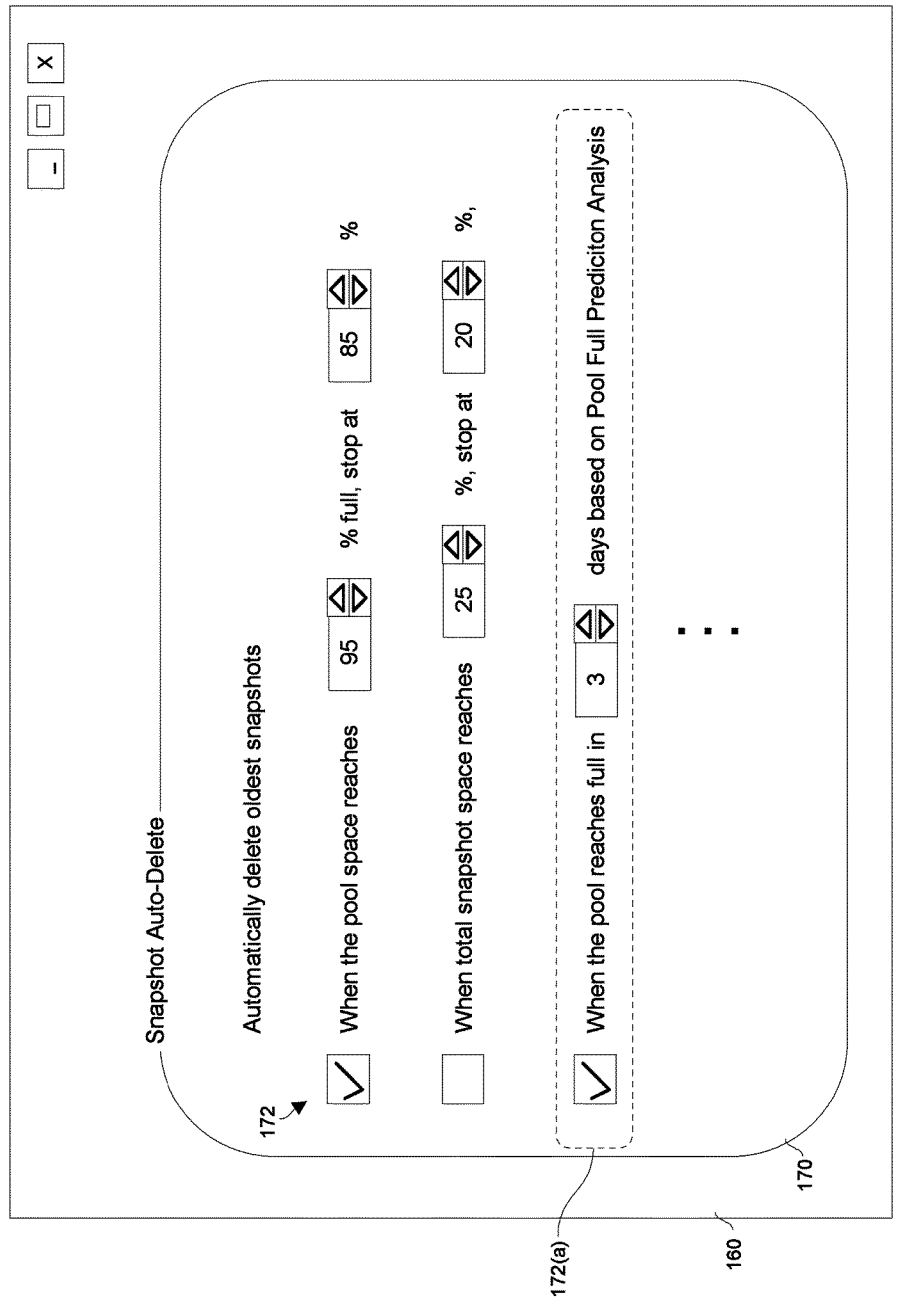
FIG. 5 is a block diagram illustrating particular details of another GUI screen provided by the electronic apparatus of FIG. 2.

FIG. 5 shows another screen 170 of the GUI 160 which offers the user the ability to enter and/or customize auto-deletion policies 172. In this example, a particular auto-deletion policy 172(a) triggers auto-deletion of the oldest snapshots 114 (FIG. 3) when the specialized circuitry estimates that there are 3 days left before the storage pool 52 reaches full capacity.

As explained in the examples provided earlier, other auto-deletion policies 172 are suitable for use as well, e.g., based on an estimate as to when the storage pool 52 will be completely full, when the storage pool 52 will be X % full (e.g., where X is a number such as 70, 80, etc.), and so on.

Moreover, as shown in the screen 170, such multiple policies 172 provide additional safeguards against fully consuming the storage pool 52 over standard policies that are not based on estimations.

Figure 6:
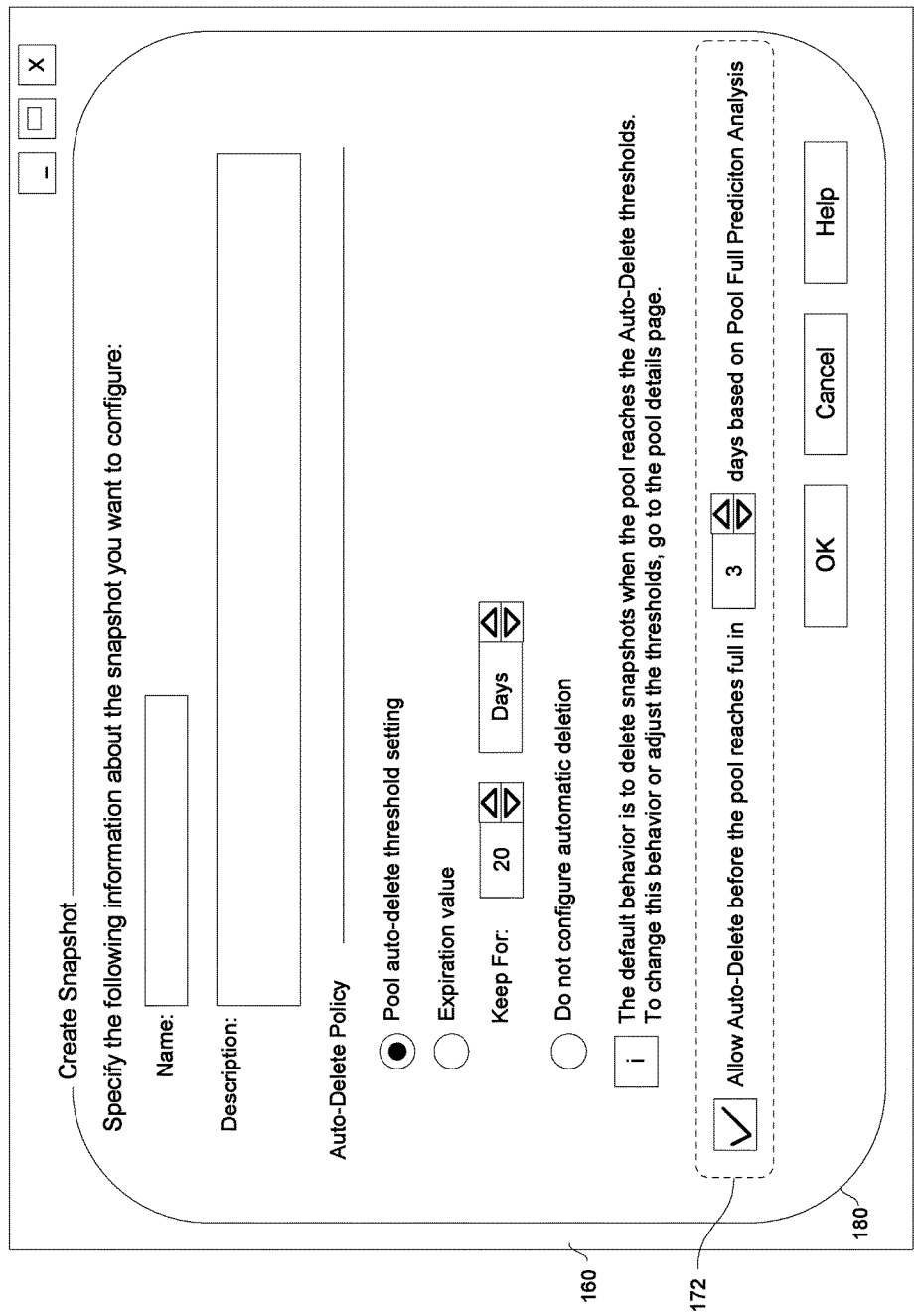
FIG. 6 is a block diagram illustrating particular details of yet another GUI screen provided by the electronic apparatus of FIG. 2.

FIG. 6 shows another screen 180 of the GUI 160 which offers the user the ability to set an auto-deletion policy 172 for a particular snapshot 114. Such a feature enables the user to control snapshot auto-deletion at a granular level irrespective of other aspects of the snapshot 114 such as age, size, etc.

In the example of FIG. 6, the policy 172 directs the specialized circuitry to automatically delete the particular snapshot 114 if the storage pool 52 reaches a consumption level in which the specialized circuitry predicts that the storage pool 52 will become full in 3 days. Other amounts of time are suitable for use as well (e.g., 1 day, 2 days, 4 days, 5 days, 1 week, etc.).

Figure 7:
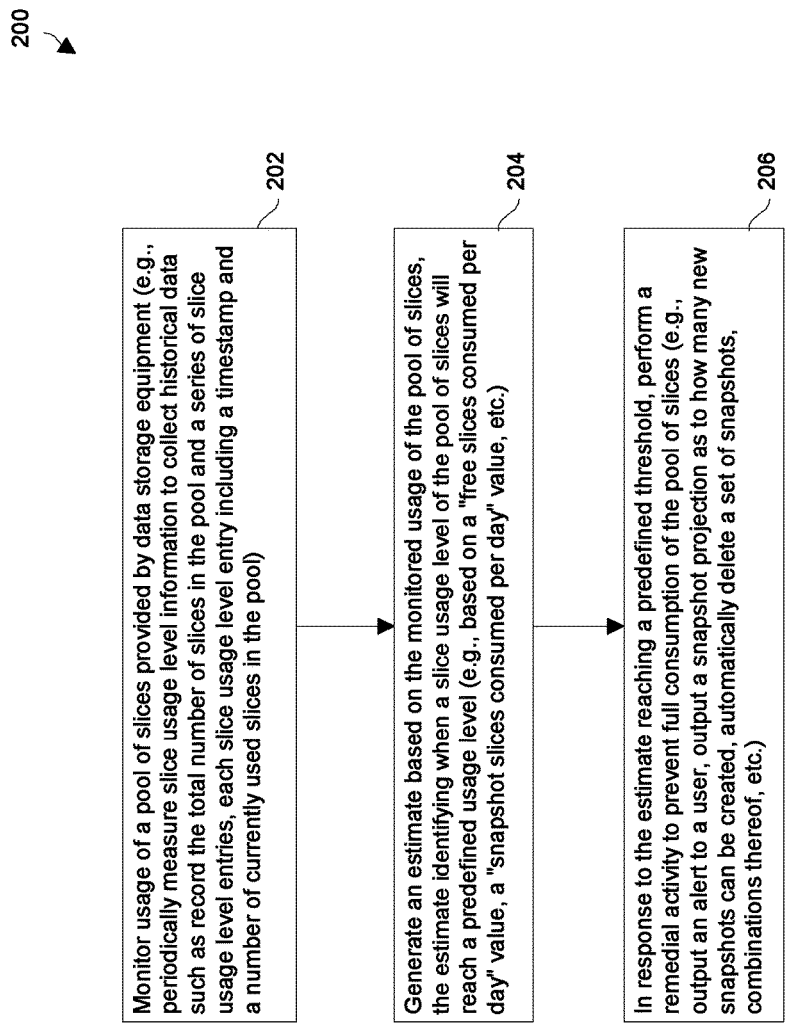
FIG. 7 is a flowchart of a procedure which is performed by the electronic apparatus of FIG. 2.

As further shown in the example of FIG. 7, other features are available for the particular snapshot 114. Furthermore, the user is able to return to the screen 180 at later times to modify the granular auto-deletion policy settings for the particular snapshot 114. For example, the user can selectively enable and disable the auto-deletion feature. Additionally, the user can direct the specialized circuitry to maintain the particular snapshot 114 for an amount of time before the particular snapshot 114 expires, where the specialized circuitry cannot automatically delete the particular snapshot 114 until after the snapshot 114 has expired. Furthermore, the user can allow the specialized circuitry to automatically delete the particular snapshot 114 in response to a general auto-deletion policy if that general auto-deletion policy is triggered ahead of the individual auto-deletion policy, and so on. Further details will now be provided with reference to FIG. 7.

FIG. 7 is a flowchart of a procedure 200 which is performed by specialized circuitry to manage a pool of slices provided by the data storage equipment 24. Such a procedure 200 safeguards the pool of slices from becoming completely full.

At 202, the specialized circuitry, monitors usage of the pool of slices provided by the data storage equipment. Along these lines, the specialized circuitry, periodically measures slice usage level information of the pool of slices to collect historical data describing usage of the pool of slices. For example, the specialized circuitry can record a total number of slices in the pool and a series of slice usage level entries, where each slice usage level entry includes a timestamp and a number of currently used slices in the pool.

At 204, the specialized circuitry generates an estimate based on the monitored usage of the pool of slices, the estimate identifying when a slice usage level of the pool of slices will reach a predefined usage level. A variety of calculations are suitable for use.

For example, the specialized circuitry derives a "free slices consumed per day" value from the multiple measured slice usage levels. From this value, the specialized circuitry can project the number of days before the pool of slices will be fully consumed, the number of days before the pool of slices will become X % full, the number of days before there will only be X days before the pool of slices will become full, etc.

As another example, the specialized circuitry can derive a "snapshot slices consumed per day" value. From this value, the specialized circuitry can project the number of days before allocated snapshot space (e.g., X % of the storage pool) will be fully consumed, the number of days before the pool of slices will become X % full, the number of days before there will only be X days before the allocated snapshot space will become fully consumed, etc.

At 206, the specialized circuitry, in response to the estimate reaching a predefined threshold, performs a remedial activity to prevent full consumption of the pool of slices. For example, in response to the estimate reaching the predefined threshold, the specialized circuitry can output an alert to a user based on the estimate, the alert identifying a time when the pool of slices is expected to be fully consumed. Additionally, the specialized circuitry can output a snapshot projection which indicates how many new snapshots can be created. Furthermore, the specialized circuitry can automatically delete a set of snapshots (e.g., the oldest snapshots, the largest snapshots, snapshots identified at a granular level, etc.). Such remedial activities as well as others help prevent the storage pool from becoming fully consumed.

It should be understood that the procedure 200 can be implemented in addition to standard auto-deletion policies which are not based on estimates. Accordingly, the estimation features are able to augment already existing precautions against completely filling the storage pool. That is, in these arrangements, intelligent pool space management using historical data provides another option to complement standard pool space management based on space thresholds and snapshot expiration.

As described above, improved techniques are directed to managing a pool 52 of storage slices 50 via consumption estimation based on historical data. Along these lines, the number of slices 50 consumed from the storage pool 52 for a period of time (e.g., an hour, a day, a week, etc.) can be predicted based on past usage measurements. Such a prediction can then be used to estimate how much time is left before a particular consumption milestone is reached (e.g., 80% utilization, 90% utilization, 100% utilization, etc.). Similarly, the number of slices 50 consumed for snapshots 114 for a period of time can be predicted based on past usage measurements, and such a prediction can then be used to estimate when a limited amount of snapshot space will be fully consumed (e.g., 15% of the storage pool, 20%, 25%, 30%, etc.). The underlying data storage equipment 24 is then able to take remedial steps in response to such estimation, e.g., provide an alert to a user, automatically delete snapshot data, combinations thereof, etc.

One should appreciate that the above-described techniques do not merely perform calculations to delete data abstractly. Rather, the disclosed techniques involve generating particular storage pool consumption estimates which are then used to trigger certain remedial activities such as warning a user of a particular data storage condition, auto-deletion of snapshot data, etc. Such techniques provide improvements to data storage technology as well as other advantages, e.g., enabling high availability where host computers can continue to have I/O requests 30 processed, effective snapshot 114 management, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A computer-implemented method of managing a pool of slices provided by data storage equipment, the computer-implemented method comprising:
    monitoring usage of the pool of slices provided by the data storage equipment, the monitoring including monitoring i) numbers of slices that are consumed from the pool of slices to store snapshot data contained in one or more snapshots and ii) numbers of slices reclaimed by the pool of slices from snapshots that are automatically deleted, wherein the snapshots comprise point in time copies of host data written to slices allocated from the pool of slices in response to receipt of the host data by the data storage equipment from a host computer, and wherein each slice in the pool of slices comprises an increment of storage derived from a portion of a logical unit of storage;
    generating an estimate based on the monitored usage of the pool of slices, the estimate identifying an estimated amount of time remaining until a slice usage level of the pool of slices is predicted to reach a predefined usage level, wherein the slice usage level of the pool of slices comprises a percentage of the pool of slices that is consumed to store snapshot data, wherein the predefined usage level comprises a maximum percentage of the pool of slices that may be consumed to store snapshot data, and wherein the predefined threshold comprises a user defined minimum amount of time prior to when the slice usage level is predicted to reach the predefined usage level;
    in response to generating the estimate based on the monitored usage of the pool of slices, comparing the estimate to a predefined threshold; and
    in response to detecting that the estimate is less than or equal to a predefined threshold, initiating automatic deletion by the data storage equipment of a set of snapshots from the pool of slices to prevent full consumption of the pool of slices.

2. A computer-implemented method as in claim 1 wherein monitoring the usage of the pool of slices includes:
    periodically measuring slice usage level information of the pool of slices to collect historical data describing usage of the pool of slices.

3. A computer-implemented method as in claim 2 wherein periodically measuring the slice usage level information includes:
    recording a total number of slices in the pool and a series of slice usage level entries, each slice usage level entry including a timestamp and a number of currently used slices in the pool.

4. A computer-implemented method as in claim 2 wherein the monitored usage of the pool of slices includes multiple measured slice usage levels; and wherein generating the estimate includes:
    deriving a "free slices consumed per day" value from the multiple measured slice usage levels, the "free slices consumed per day" value indicating a number of free slices that are consumed by data from the pool of slices per day.

5. A computer-implemented method as in claim 4 wherein generating the estimate further includes:
    providing, as the estimate and based on the "free slices consumed per day" value, a "number of days" projection which identifies a number of further days before the pool of slices will be fully consumed.

6. A computer-implemented method as in claim 4 wherein generating the estimate further includes:
    providing, as the estimate and based on the "free slices consumed per day" value, a "number of days" projection which identifies a number of further days before the pool of slices will be X % consumed, where X is a number between 70 and 100.

7. A computer-implemented method as in claim 4 wherein generating the estimate further includes:
    providing, as the estimate and based on the "free slices consumed per day" value, a "number of days" projection which identifies a number of further days before there will be only X days left until the pool of slices is fully consumed, where X is a positive integer.

8. A computer-implemented method as in claim 2 wherein the monitored usage of the pool of slices includes multiple measured slice usage levels; and wherein generating the estimate includes:
    deriving a "snapshot slices consumed per day" value from the multiple measured slice usage levels, the "snapshot slices consumed per day" value indicating a number of slices that are consumed for snapshot data per day.

9. A computer-implemented method as in claim 8 wherein generating the estimate further includes:
    providing, as the estimate and based on the "snapshot slices consumed per day" value, a "number of days" projection which identifies a number of further days before an allocated snapshot space will be fully consumed.

10. A computer-implemented method as in claim 8 wherein generating the estimate further includes:
    providing, as the estimate and based on the "snapshot slices consumed per day" value, a "number of days" projection which identifies a number of further days before the pool of slices will be X % consumed by snapshot data, where X is a number between 5 and 30.

11. A computer-implemented method as in claim 8 wherein generating the estimate further includes:
    providing, as the estimate and based on the "snapshot slices consumed per day" value, a "number of days" projection which identifies a number of further days before there will be only X days left until an allocated snapshot space will be fully consumed, where X is a positive integer.

12. A computer-implemented method as in claim 2, further comprising:
in response to the estimate reaching the predefined threshold, outputting an alert to a user based on the estimate, the alert identifying a time when the pool of slices is expected to be fully consumed.

13. A computer-implemented method as in claim 12, further comprising:
in response to the estimate reaching the predefined threshold, outputting a snapshot projection which indicates how many new snapshots the pool of slices is expected to store before the pool of slices becomes fully consumed.

14. A computer-implemented method as in claim 2 further comprising:
detecting that the estimate has reached the predefined threshold before detection that an actual slice usage level of the pool of slices has reached a threshold that triggers snapshot auto-deletion.

15. A computer-implemented method as in claim 1 wherein initiating automatic deletion by the data storage equipment of the set of snapshots from the pool of slices includes
removing an oldest deletable snapshot from the pool of slices.

16. A computer-implemented method as in claim 1 wherein initiating automatic deletion by the data storage equipment of the set of snapshots from the pool of slices includes
removing a largest deletable snapshot from the pool of slices.

17. A computer-implemented method as in claim 1 wherein initiating automatic deletion by the data storage equipment of the set of snapshots from the pool of slices includes
removing the set of snapshots from the pool of slices in accordance with a snapshot list providing snapshot level granularity for automatic deletion.

18. The computer-implemented method as in claim 1, further comprising:
in response to detecting that the estimate is less than or equal to the predefined threshold, outputting an alert to a user, wherein the alert indicates both i) the estimated amount of time remaining until the percentage of the pool of slices that is consumed to store snapshot data is predicted to reach the maximum percentage of the pool of slices that may be consumed to store snapshot data, and ii) a projected number of new snapshots that can be created before the percentage of the pool of slices that is consumed to store snapshot data is predicted to reach the maximum percentage of the pool of slices that may be consumed to store snapshot data.

19. Electronic circuitry, comprising:
memory; and
control circuitry coupled to the memory, the memory storing instructions which, when carried out by the control circuitry, cause the control circuitry to:
monitor usage of a pool of slices provided by data storage equipment, at least in part by monitoring i) numbers of slices that are consumed from the pool of slices to store snapshot data contained in one or more snapshots and ii) numbers of slices reclaimed by the pool of slices from snapshots that are automatically deleted, wherein the snapshots comprise point in time copies of host data written to slices allocated from the pool of slices in response to receipt of the host data by the data storage equipment from a host computer, and wherein each slice in the pool of slices comprises an increment of storage derived from a portion of a logical unit of storage,
generate an estimate based on the monitored usage of the pool of slices, the estimate identifying an estimated amount of time remaining until a slice usage level of the pool of slices is predicted to reach a predefined usage level, wherein the slice usage level of the pool of slices comprises a percentage of the pool of slices that is consumed to store snapshot data, wherein the predefined usage level comprises a maximum percentage of the pool of slices that may be consumed to store snapshot data, and wherein the predefined threshold comprises a user defined minimum amount of time prior to when the slice usage level is predicted to reach the predefined usage level,
in response to generation of the estimate based on the monitored usage of the pool of slices, compare the estimate to a predefined threshold, and
in response to detecting that the estimate is less than or equal to a predefined threshold, initiate automatic deletion by the data storage equipment of a set of snapshots from the pool of slices to prevent full consumption of the pool of slices.

20. A computer program product having a non-transitory computer readable medium which stores a set of instructions to manage a pool of slices provided by data storage equipment; the set of instructions, when carried out by computerized circuitry, causing the computerized circuitry to perform a method of:
monitoring usage of the pool of slices provided by the data storage equipment, the monitoring including monitoring i) numbers of slices that are consumed from the pool of slices to store snapshot data contained in one or more snapshots and ii) numbers of slices reclaimed by the pool of slices from snapshots that are automatically deleted, wherein the snapshots comprise point in time copies of host data written to slices allocated from the pool of slices in response to receipt of the host data by the data storage equipment from a host computer, and wherein each slice in the pool of slices comprises an increment of storage derived from a portion of a logical unit of storage;
generating an estimate based on the monitored usage of the pool of slices, the estimate identifying an estimated amount of time remaining until a slice usage level of the pool of slices will reach a predefined usage level, wherein the slice usage level of the pool of slices comprises a percentage of the pool of slices that is consumed to store snapshot data, wherein the predefined usage level comprises a maximum percentage of the pool of slices that may be consumed to store snapshot data, and wherein the predefined threshold comprises a user defined minimum amount of time prior to when the slice usage level is predicted to reach the predefined usage level;
in response to generating the estimate based on the monitored usage of the pool of slices, comparing the estimate to a predefined threshold; and
in response to detecting that the estimate is less than or equal to a predefined threshold, initiating automatic deletion by the data storage equipment of a set of snapshots from the pool of slices to prevent full consumption of the pool of slices.

* * * * *